United States Patent [19]

Neri

[11] Patent Number: 5,955,519

[45] Date of Patent: Sep. 21, 1999

[54] USE OF A CHEMICAL AGENT FOR INCREASING RADIATION RESISTANCE OF POLYVINYL CHLORIDE COMPOSITIONS

[75] Inventor: Roberto Neri, Mirandola, Italy

[73] Assignee: Hospal AG, Switzerland

[21] Appl. No.: 09/011,137

[22] PCT Filed: Jun. 3, 1997

[86] PCT No.: PCT/IB97/00634

§ 371 Date: May 28, 1998

§ 102(e) Date: May 28, 1998

[87] PCT Pub. No.: WO97/46613

PCT Pub. Date: Dec. 11, 1997

[30] Foreign Application Priority Data

Jun. 4, 1996 [IT] Italy .................................. TO96A0483

[51] Int. Cl.$^6$ .............................. C08K 5/11; C08L 27/06
[52] U.S. Cl. ........................... 524/58; 524/284; 524/300; 524/306; 524/312; 524/313; 524/314; 524/399; 524/400; 524/425; 524/456; 524/763; 604/403
[58] Field of Search ............................. 524/27, 58, 284, 524/300, 306, 312, 313, 314, 399, 400, 425, 456, 763; 604/403

[56] References Cited

U.S. PATENT DOCUMENTS

| 4,110,185 | 8/1978 | Williams et al. . |
| 4,111,889 | 9/1978 | Kaneko et al. . |
| 4,222,379 | 9/1980 | Smith . |

FOREIGN PATENT DOCUMENTS 0 345 662   12/1989   European Pat. Off. .

OTHER PUBLICATIONS

D.S. Housel, Technical Papers—63$^{rd}$ Annual Technical Conference, Apr. 1985, Washington, DC, "Factors Infuencing Color Drift of Gamma Sterilized PVC Articles".

International Search Report.

*Primary Examiner*—Nathan M. Nutter
*Attorney, Agent, or Firm*—Millen, White, Zelano & Branigan, P.C.

[57] ABSTRACT

The subject of the present invention is the use of at least one alkyl ester of adipic acid in a polyvinyl chloride (PVC) composition for the production of products made from biocompatible material, in particular blood lines, to increase the resistance of these products to irradiation with penetrating rays.

13 Claims, No Drawings

5,955,519

USE OF A CHEMICAL AGENT FOR INCREASING RADIATION RESISTANCE OF POLYVINYL CHLORIDE COMPOSITIONS

This application was filed under 35 USC 371 as based upon PCT/IB97/00634 which was filed Jun. 3, 1997.

The subject of the present invention is the use of a chemical agent in plasticized polyvinyl chloride (PVC) compositions intended for the production of products made from biocompatible material, in particular blood lines, connections and containers used, for example, in transfusions and dialysis, to increase the radiation resistance of these products made from biocompatible materials without damaging their biocompatibility.

As is widely known, PVC is a polymeric material which is very widely used in numerous fields in the art: practically in each of these applications, it is nevertheless not used as such but in combination with a series of additives, in particular plasticizers, stabilizers and lubricants which enhance its mechanical characteristics, stability and machinability.

In the medical field, and in particular for the production of the range of devices, lines and containers intended for the treatment of blood and of its derivatives, the use of PVC plasticized with di(2-ethylhexyl)phthalate (commonly designated DOP) is known.

Although DOP is the plasticizer provided for by the Official Italian Pharmacopoeia, it has, on several occasions, been the subject of discussions connected with the contraindications, of a toxicological nature, linked to its use. It is clear that the use, in the medical field, of any material cannot ignore the evaluation of its possible toxicological aspects (that is to say of its biocompatibility).

The use of another plasticizer, tri(2-ethylhexyl) trimellitate (TOTM), whose biocompatibility has been experimentally verified, is also known.

The abovementioned plasticized PVC compositions for products made from biocompatible material exhibit, nevertheless, the main disadvantage of undergoing structural alterations when they are subjected to irradiations of penetrating rays as occurs, for example, if the product made from them undergoes sterilization with gamma or beta rays.

It is known, indeed, that products for medical use which are made from plasticized PVC should be sterilized before use. The sterilization methods normally used are the ethylene oxide-based process (designated hereinafter in the abbreviated form by ETO sterilization) and the irradiation of penetrating rays of the gamma or beta ray type (designated hereinafter as gamma sterilization or beta sterilization).

Gamma and beta sterilizations, although very effective from the point of view of the degree of sterilization obtained, produce, on the abovementioned plasticized PVC compositions, structural alterations with a possible emission of volatile substances, which are typically indicated by yellowing of the material. The phenomenon is more marked with conventional compositions containing DOP, to the extent that normally, for these materials, ETO sterilization is used, but it is also observed, although to a lesser degree, with materials containing TOTM.

A composition of PVC plasticized with di(2-ethylhexyl) adipate whose use is limited to the production of blood donating bags is also known from patent U.S. Pat. No. 4,222,379. Indeed, according to this patent, di(2-ethylhexyl) adipate is extractable and leads to a substantial reduction in the quantity of plasma haemoglobin during the storage of blood in PVC bags containing this plasticizer. Accordingly, it is recommended in this patent to limit contact between blood and PVC products containing this plasticizer. In addition, steam sterilization (in an autoclave) is recommended for these blood donating bags made from plasticized PVC.

A first subject of the present invention is therefore to solve the abovementioned problems encountered with products for medical use made from PVC and sterilized by irradiations of penetrating rays of the gamma or beta ray type.

Surprisingly, it has been found that it is possible to considerably reduce the susceptibility to structural alterations induced by irradiation of penetrating rays of the gamma or beta ray type of a plasticized polyvinyl chloride (PVC) composition suited to the production of products made from biocompatible material such as blood lines, connections and containers by incorporating into this composition at least one alkyl ester of adipic acid, preferably di(2-ethylhexyl)adipate, commonly designated DOA.

In a manner well known per se, the alkyl ester of adipic acid, more particularly DOA, also serves as plasticizer for the PVC composition.

Advantageously, the PVC composition comprises, in addition, at least one lubricant-stabilizer, at least one stabilizer and at least one lubricant, all of a known type.

In this manner, a good plasticizing effect is obtained at the same time, which makes it possible to have good machinability of the composition and good mechanical properties for the products produced, in particular blood lines, and a low tendency of the material to undergo alterations through the effect of radiation; thus, the external appearance of the blood lines produced with the composition according to the invention is consequently resolutely enhanced compared with that of current lines, the yellowish colour taken after irradiation being inexistent and the colour being more stable over time; the odour which is also perceptible immediately after opening the blister in which the lines are kept is found to be less perceptible and intense than that obtained with current lines, probably confirming a lesser development of volatile substances which is caused by the irradiations. In addition, the plasticized PVC composition according to the invention is better, from the biocompatibility point of view, than the compositions currently used.

The subject of the invention is also a process for substantially increasing the resistance to irradiations of penetrating rays of the gamma or beta ray type of products made from biocompatible material based on a plasticized PVC composition without damaging their biocompatibility, characterized in that at least one alkyl ester of adipic acid is incorporated into the PVC composition.

Preferably, this process mainly comprises the steps of:
a) incorporating into a plasticized PVC composition at least one alkyl ester of adipic acid, preferably di(2-ethylhexyl)adipate (DOA). This PVC composition advantageously comprises, in addition, at least one lubricant-stabilizer, at least one stabilizer and at least one lubricant;
b) if necessary, extruding and reducing the plasticized PVC composition to granules;
c) manufacturing, from the PVC composition, generally by extrusion and/or moulding, a product made from biocompatible material, in particular blood lines or alternatively connections and containers used, for example, in transfusions and dialysis;

d) sterilizing the product obtained made from biocompatible material, preferably by irradiation of penetrating rays.

The PVC composition according to the invention is in accordance with what is recommended by the Italian and European Pharmacopoeia for the production of containers for human blood and its fractions, except for the fact that it contains as plasticizer, instead of DOP which is provided for by the Pharmacopoeia, DOA, which nevertheless appears in Annex II section 1 part B of Directive No. 220 of Apr. 26, 1993 (updating of the Directive of Mar. 21, 1973 and definite acceptance of the EC Directives) and therefore proves in accordance with at least the requirements required by the Italian and European standards on plastic materials intended to come into contact with food.

Accordingly, the composition according to the invention was subjected not only to comparative tests with other commercial PVC compositions for similar use, but also to a series of chemical and biological tests to check its biocompatibility. As is widely known, the biocompatibility of a plastic material (or of a medical instrument, for example a blood line, made with this material), is evaluated by means of a chemical and biological analysis which is intended to evaluate and measure the substances emitted by the material and/or by its soluble components (chemical analysis) and the possible toxic potentials of these substances (biological analysis).

The analysis of materials made from PVC plasticized with DOA and of products, in particular blood lines, made with these materials was carried out in accordance with the procedures recommended by the official national and/or international standards.

In the framework of the invention, the PVC composition advantageously comprises, as a percentage of its total weight:

50 to 75% of PVC resin;

20 to 45% of at least one plasticizer chosen from the alkyl esters of adipic acid;

2.5 to 4.5% of at least one lubricant-stabilizer chosen from the group comprising the epoxidized triglycerides;

0.6 to 1.5% of one or more stabilizers chosen from the group comprising calcium and zinc salts;

0 to 0.1% of polyolefin waxes;

and 0.05 to 0.5% of pentaerythritol esters.

According to a preferred embodiment of the invention, the composition comprises, as a percentage of its total weight:

50 to 75% of PVC resin;

20 to 45% of di(2-ethylhexyl)adipate (DOA);

2.5 to 4.5% of epoxidized soya bean oil;

0.6 to 1.5% of calcium-zinc containing stabilizers;

0 to 0.1% of polyolefin wax;

and 0.05 to 0.5% of pentaerythritol adipate oleate.

By way of example of PVC compositions, there may be mentioned:

a first PVC composition comprising, as a percentage of its total weight:

63.34% of PVC resin (PVC K70) manufactured by the company E.V.C., 32.62% of di(2-ethylhexyl)adipate (DOA), 3.18% of epoxidized soya bean oil manufactured by CIBA GEIGY, 0.76% of calcium and zinc salts, as stabilizer, 0.1% of pentaerythritol adipate oleate;

a second PVC composition comprising, as a percentage of its total weight:

55.14% of PVC resin (PVC K80) manufactured by the company E.V.C., 41.35% of di(2-ethylhexyl)adipate (DOA), 2.76% of epoxidized soya bean oil manufactured by CIBA GEIGY, 0.66% of calcium and zinc salts, as stabilizer, 0.09% of pentaerythritol adipate oleate.

The calcium and zinc salts may be a mixture of calcium stearate and zinc stearate or a mixture of calcium stearate and zinc octanoate.

The composition is generally obtained by successive extrusion and reduction of the components, mixed in the percentages indicated above, to granules.

Other characteristics and advantages of the present invention will appear clearly from the description which follows of some nonlimiting examples of its implementation, with reference to the accompanying drawings, in which:

Table 1 describes a composition according to the invention, expressed as a percentage over the total weight;

TABLE 1

| Component | Content % by weight over total |
|---|---|
| PVC resin | 65 ± 1 |
| DOA plasticizer | 31 ± 1 |
| Epoxidized soya bean oil | 2.9 ± 0.1 |
| Ca/Zn based stabilizer | 1.0 ± 0.1 |
| Lubricant | 0.1 ± 0.01 |

Table 2 describes the minimum and maximum values of the components constituting a preferred embodiment of the invention, expressed as a percentage over the total weight;

TABLE 2

| Component | Content % by weight over total |
|---|---|
| PVC resin | 56–72 |
| Plasticizer | 21–40 |
| Epoxidized soya bean oil | 2.8–4.5 |
| Ca/Zn based stabilizer | 0.6–1.5 |
| Polyolefin wax | 0.02–0.1 |
| Pentaerythritol adipate oleate | 0.1–0.5 |

Table 3 describes the results of the chemical tests provided for by the Official European Pharmacopoeia carried out on samples of four PVC compositions which are within the limits of Table 2 and containing a different content of plasticizer, and which are partly sterilized with ethylene oxide and partly sterilized with gamma rays;

TABLE 3

| Chemical tests | Limits | DOA 31% γ | DOA 31% ETO | DOA 40% γ | DOA 40% ETO | DOA 21% γ | DOA 21% ETO | DOA 26% γ | DOA 26% ETO |
|---|---|---|---|---|---|---|---|---|---|
| COLOUR | Colour abs. | OK | OK | OK | OK | OK | OK | OK | OK |
| TURBIDITY | Clear | OK | OK | OK | OK | OK | OK | OK | OK |
| ACIDITY | <1.0 ml | 0.45 | 0.14 | 0.45 | 0.15 | 0.44 | 0.14 | 0.44 | 0.14 |
| REDUCING SUBSTANCES | <3.0 ml | 0.10 | 0.16 | 0.11 | 0.05 | 0.11 | 0.18 | 0.08 | 0.37 |
| UV-Ext. | <0.25 abs. | 0.016 | 0.014 | 0.011 | 0.007 | 0.032 | 0.021 | 0.022 | 0.013 |
| RES. EVAPORATION | <7.5 mg | 2.38 | 1.02 | 2.29 | 0.61 | 1.37 | 0.19 | 2.53 | 1.30 |
| Vinyl chloride monomer | <1.0 ppm | <L.V. | <L.V. | <L.V. | <L.V. | <L.V. | <L.V. | <L.V. | <L.V. |
| CADMIUM | <0.6 ppm | <L.V. | <L.V. | <L.V. | <L.V. | <L.V. | <L.V. | <L.V. | <L.V. |
| TIN | <30 ppm | <L.V. | <L.V. | <L.V. | <L.V. | <L.V. | <L.V. | <L.V. | <L.V. |
| HEAVY METALS | <50 ppm | <L.V. | <L.V. | <L.V. | <L.V. | <L.V. | <L.V. | <L.V. | <L.V. |
| BARIUM | <30 ppm | <L.V. | <L.V. | <L.V. | <L.V. | <L.V. | <L.V. | <L.V. | <L.V. |
| CALCIUM | <0.7 ppm | 0.029 | 0.153 | 0.026 | 0.226 | 0.024 | 0.062 | 0.024 | 0.084 |

UV-Ext. = Ultraviolet Extinction
RES. EVAPORATION - Residue on Evaporation

Table 4 summarizes the results of the biological analysis carried out on samples of four PVC compositions which are within the limits of Table 2 and containing a different content of plasticizer, and which are sterilized with gamma rays;

TABLE 4

| BIOLOGICAL TESTS | DOA 31% | DOA 41% | DOA 21% | DOA 26% |
|---|---|---|---|---|
| Cytotoxicity (USP XXIII) | non-cytotoxic | non-cytotoxic | non-cytotoxic | non-cytotoxic |
| Acute systemic toxicity (USP XXIII) | nontoxic | nontoxic | nontoxic | nontoxic |
| Intracutaneous irritation (USP XXIII) | nontoxic | nontoxic | nontoxic | nontoxic |
| Haemolysis (DIN 58367) limit <0.03 abs | 0.023 | 0.024 | 0.025 | 0.018 |

Table 5 describes the most significant results of the comparative biological analysis carried out on samples of a plasticized PVC composition according to the invention and samples of similar commercial compositions, which are all sterilized with gamma rays;

TABLE 5

| BIOLOGICAL TESTS | Limiting values | PVC ± DOP | PVC ± TOTM | PVC ± DOA |
|---|---|---|---|---|
| Cytotoxicity (USP XXIII) | in conformity | in conformity | in conformity | in conformity |
| Haemolysis test (DIN 58361) | non-haemolytic | non-haemolytic | non-haemolytic | non-haemolytic |
| Intracutaneous irritation (USP XXIII) | in conformity | in conformity | in conformity | in conformity |
| Systemic acute toxicity (USP XXIII) | nontoxic | nontoxic | nontoxic | nontoxic |

Table 6 describes the results of the chemical and biological analysis carried out according to the Official Italian Pharmacopoeia and the ISO-10993-1 standard on the components of blood lines made from a PVC composition according to the invention, partly sterilized with ethylene oxide and partly sterilized with gamma rays;

TABLE 6

| | Limiting values | ETO STER. OIP IX Ed. | ETO STER. ISO 10993 | GAMMA STER. OIP IX Ed. | GAMMA STER. ISO 10993 |
|---|---|---|---|---|---|
| Chemical tests | | | | | |
| Acidity | <0.6 ml | 0.01 | 0.10 | 0.07 | 0.30 |
| pH | ±2 (DIN 58352) | 0.23 | 0.30 | 0.91 | 0.83 |
| Reducing substance | <2 ml | 1.5 | / | 1.20 | / |
| Res. evaporation | | 0.31 | 0.23 | 0.30 | 1.39 |
| UV-Ext. | <0.300 | 0.013 | 0.130 | 0.014 | 0.161 |
| Chromium. Cr | <0.05 mg/l | <L.V | / | <L.V | / |
| Nickel. Ni | <0.500 mg/l | <L.V | / | <L.V | / |
| Lead. Pb | <0.0 mg/l | <L.V | <L.V | <L.V | <L.V |
| Arsenic. As | <0.05 mg/l | <L.V | / | <L.V | / |
| Cadmium. Cd | <0.02 mg/l | <L.V | <L.V | <L.V | <L.V |
| Heavy metals | <2 mg/l | / | <L.V | / | <L.V |
| Aluminium. Al | <0.1 mg/l | / | <L.V | / | <L.V |
| Mercury. Hg | <0.03 mg/l | / | <L.V | / | <L.V |
| Residual ETO | <0.5 ppm | 0.36 | / | / | / |
| CVM | | 0.36 | <L.V | | <L.V |
| Biological tests | | | | | |
| Test of sterility using a biological indicator | no growth | no growth | / | no growth | / |
| Non-pyrogenicity by (LAL Test) | <0.5 EU/ml | <0.005 | / | <0.005 | / |
| Haemolysis Test (DIN 58361) | 0.03 abs | 0.009 | 0.010 | 0.013 | 0.017 |
| Cytotoxicity (USP XXIII) | in conformity | / | in conformity | / | in conformity |

*CVM - vinyl chloride monomer

Table 7 describes the most significant results of the comparative chemical and biological analysis carried out on components of the blood lines produced based on a plasticized PVC composition according to the invention and similar components produced based on commercial compositions, all sterilized with gamma rays.

TABLE 7

| Chemical tests | Limiting values | ETO sterilization | | Gamma sterilization | |
| --- | --- | --- | --- | --- | --- |
| | | PVC + DOP | PVC + DOA | PVC + TOTM | PVC + DOA |
| Acidity | <0.4 ml | <L.V | <L.V | <L.V | <L.V |
| Reducing substance | <2 ml | 1.8 | / | 1.15 | / |
| UV-Ext. | <0.300 abs | 0.11 | 0.13 | 0.07 | 0.16 |
| pH | ±2 | −0.66 | −0.3 | −1.24 | −0.83 |
| Residual plasticizer | <400 mg/g (Off. Eu. Phrm.) | <0.03 | / | <0.03 | / |
| Biological tests | | | | | |
| Cytotoxicity (USP XXIII) | <30% | in conformity | in conformity | in conformity | in conformity |
| Haemolysis Test (DIN 58361) | <0.300 abs | 0.011 | 0.010 | 0.010 | 0.017 |

EXAMPLE 1

By proceeding according to the technological notes for machining PVC (mixing, extrusion and reduction to granules), a first plasticized PVC composition was prepared, based on the composition indicated in Table 1, and in particular a plasticizer (DOA) content of 31% by weight over the total. Three other compositions were then prepared, by varying, relative to the preceding one, the percentage of plasticizer content (and consequently that of the other components): in the end, four compositions were considered, which are essentially characterized by a different plasticizer content (precisely 21%, 26%, 31% and 40% by weight over the total) and which cover the domains indicated in Table 2.

Samples of each material were subjected to a sterilization cycle with ethylene oxide, according to the procedures usually applied. Other samples of each material were subjected to a sterilization cycle with gamma rays, at the minimum dose of 25 kGy. The samples were then chemically and biologically analysed, in accordance with international procedures. More particularly, chemical tests were carried out on all the samples (both those which were ETO sterilized and those which were gamma sterilized) according to the Official European Pharmacopoeia (section VI, paragraph 1.2.1.2.: "Materials based on plasticised polyvinyl chloride for tubing used in set for transfusion of blood and blood components") and, in parallel, according to the strictest standard DIN 58352 (Part 3: "Extracorporeal circuit, hemodialysis, dialyzers and blood line systems made of plastics; requirements and testing"); in addition, biological tests were carried out solely on samples which were gamma sterilized (this being the most severe treatment from the toxicity point of view).

Table 3 indicates the results of the chemical analysis carried out according to the Official European Pharmacopoeia both on the ETO sterilized samples and on the gamma sterilized samples.

As can be noted, all the materials prove to be in accordance with the Official European Pharmacopoeia.

In addition, all the materials pass the biological tests applied, the results of which are indicated in Table 4.

EXAMPLE 2

A comparative chemical and biological analysis was carried out between similar PVC compositions but containing, as plasticizer, DOA, DOP and TOTM, respectively, in quantities such that they allow the same functional characteristics to be obtained. The samples of the material obtained according to the methods described in Example 1 with the highest plasticizer content (40% of DOA), subjected to gamma sterilization, were taken into account because they were judged to be more significant. The analysis was carried out according to the procedures indicated in Example 1 and the results are indicated in Table 5.

As can be noted, the PVC plasticized with DOA exhibits, as regards the chemical and biological tests applied, a behaviour which is completely equivalent to known compositions.

EXAMPLE 3

Some blood lines were produced with the material with the highest plasticizer content obtained according to the methods indicated in Example 1, without disadvantages of a technological nature being checked. Part of the blood lines produced based on each formulation was therefore subjected to a sterilization cycle with ethylene oxide, according to the procedures usually applied, and part was subjected to a sterilization cycle with gamma rays, at the minimum dose of 25 kGy. A chemical and biological analysis was carried out on the blood lines in accordance with the Official Italian Pharmacopoeia (IXth ed., Vol. 1: "Linee ematiche") and the ISO 10993-1 standard ("Biological evaluation of medical devices, part 1: guidance on selection of tests"). The results are indicated in Table 6. All the blood lines proved to be in accordance with the Official Italian Pharmacopoeia, IXth ed. and with the ISO 10993 standard.

EXAMPLE 4

A comparative chemical and biological analysis was carried out between the blood lines produced as indicated in Example 3 and the blood lines produced based on known compositions. As already stated, blood lines made from PVC plasticized with DOP are currently sterilized with ethylene oxide, whereas those made from PVC plasticized with TOTM are sterilized with gamma rays. Blood lines which are produced from PVC plasticized with DOP and which are ETO sterilized, and blood lines which are produced from PVC plasticized with TOTM and which are gamma sterilized, were therefore considered: the comparison was made with blood lines produced from PVC according to the invention and sterilized in the same manner. The results are indicated in Table 7.

The comparison with the blood lines currently used does not reveal significant differences in the toxicochemical aspects considered. The external appearance of the blood lines which are produced based on the PVC composition of the invention and which are gamma sterilized proved resolutely better than that of the currently-produced blood lines sterilized in the same manner, which use TOTM: the colour taken after irradiation is indeed a lot less intense and more stable over time. The odour perceptible immediately after opening the blister containing the current lines with TOTM is, in addition, no longer as remarkable and perceptible after opening the blister containing the lines with DOA. This is to be related to a lesser formation and development of volatile substances which are commonly held responsible for the bad odour besides the irritant effects on the skin and the mucous membranes shown by some patients.

In the end, the blood lines which are produced based on the composition of the invention prove to be better than those currently on the market, both from the technological point of view and from the biocompatibility point of view; in addition, compared with known compositions, a lesser susceptibility to alterations induced by the process of sterilization with gamma rays is noted.

Finally, it is clear that modifications and improvements can be made to the composition described, which do not depart from the scope of the present invention.

I claim:

1. A polyvinyl chloride (PVC) composition containing, as a percentage of its total weight:

50 to 75% of PVC resin;

20 to 45% of at least one alkyl ester of adipic acid;

2.5 to 4.5% of at least one lubricant-stabilizer chosen from the group comprising the epoxidized triglycerides;

0.6 to 1.5% of one or more stabilizers chosen from the group comprising calcium and zinc salts;

0 to 0.1% of polyolefin waxes;

and 0.05 to 0.5% of pentaerythritol esters; useful in the production of products made from biocompatible material to increase the resistance of these products to irradiation with penetrating rays.

2. The composition of claim 2, wherein the PVC composition contains, as a percentage of its total weight:

50 to 75% of PVC resin;

20 to 45% of di(2-ethylhexyl)adipate (DOA);

2.5 to 4.5% of epoxidized soya bean oil;

0.6 to 1.5% of one or more stabilizers chosen from the group comprising calcium and zinc salts;

0 to 0.1% of polyolefin waxes;

and 0.05 to 0.5% of pentaerythritol adipate oleate.

3. The composition of claim 1, wherein the stabilizer is a mixture of calcium stearate and zinc stearate.

4. The composition of claim 2, wherein the stabilizer is a mixture of calcium stearate and zinc stearate.

5. The composition of claim 1, wherein the stabilizer is a mixture of calcium stearate and zinc octanoate.

6. The composition of claim 2, wherein the stabilizer is a mixture of calcium stearate and zinc octanoate.

7. A process for the manufacture of products made from biocompatible material with enhanced resistance to irradiations of penetrating rays from a plasticized polyvinyl chloride (PVC) composition, characterized in that it comprises the steps of:

a) preparing a plasticized PVC composition from, as a percentage by weight relative to the total weight of the composition:

50 to 75% of PVC resin;

20 to 45% of at least one alkyl ester of adipic acid;

2.5 to 4.5% of at least one lubricant-stabilizer chosen from the group consisting of the epoxidized triglycerides;

0.6 to 1.5% of one or more stabilizers chosen from the group consisting of calcium and zinc salts;

0 to 0.1% of polyolefin waxes;

and 0.05 to 0.5% of pentaerythritol esters;

b) manufacturing a product made from biocompatible material from the plasticized PVC composition;

c) sterilizing the product obtained.

8. The process of claim 7, wherein the sterilization is by irradiation of penetrating rays.

9. A process for the manufacture of products made from biocompatible material with enhanced resistance to irradiations of penetrating rays from a plasticized polyvinyl chloride (PVC) composition, characterized in that it comprises the steps of:

a) preparing a plasticized PVC composition from, as a percentage by weight relative to the total weight of the composition:

50 to 75% of PVC resin;

20 to 45% of di(2-ethylhexyl)adipate (DOA);

2.5 to 4.5% of epoxidized soya bean oil;

0.6 to 1.5% of one or more stabilizers chosen from the group consisting of calcium and zinc salts;

0 to 0.1% of polyolefin waxes;

and 0.05 to 0.5% of pentaerythritol adipate oleate;

b) manufacturing a product made from biocompatible material from the plasticized PVC composition;

c) sterilizing the product obtained.

10. The process of claim 9, wherein sterilization is by irradiation of penetrating rays.

11. The process according to claim 9, wherein the stabilizer is a mixture of calcium stearate and zinc stearate.

12. The process according to claim 7, wherein the stabilizer is a mixture of calcium stearate and zinc octanoate.

13. The process according to claim 7, wherein the biocompatible material is a blood line.

* * * * *